United States Patent Office 2,811,415
Patented Oct. 29, 1957

2,811,415

EXTRACTION METHOD FOR SEPARATING URANIUM, PLUTONIUM, AND FISSION PRODUCTS FROM COMPOSITIONS CONTAINING SAME

Glenn T. Seaborg, Chicago, Ill., assignor to the United States of America as represented by the United States Atomic Energy Commission No Drawing. Application April 3, 1943,
Serial No. 481,660

10 Claims. (Cl. 23—14.5)

The invention relates to methods for removing foreign substances from compositions comprising said substances and element 94, and more particularly relates to extraction methods for separating element 94 from fission products and other foreign substances present in masses of neutron irradiated uranium.

The designation "element 94" is used throughout this specification to describe the element having an atomic number of 94. The term "94$^{239}$" means the isotope of element 94 having a mass number of 239. Element 94 is also referred to in this specification and probably will become known in the art as plutonium, symbol Pu. Likewise, element 93 means an element having the atomic number of 93. Element 93 is also referred to as neptunium, symbol Np.

In this specification and claims the name of the element is used to designate generally the element either in its free state or combined in a compound. The element in its free state is designated by the term "elemental" or by its specific state, such as metallic.

This invention is fundamentally based on the discovery that element 94 has more than one oxidation state and has different solubility characteristics in its different states of oxidation. In its lower oxidation state plutonium in solution is precipitated by fluoride ion, and according to our experimental evidence plutonium in this oxidation state has an oxidation number of +4 corresponding to (Pu$^{+4}$). In its higher oxidation state or states the plutonium is soluble in the presence of fluoride ions. The experimental evidence indicates that in its fluoride-soluble state plutonium has an oxidation number of +6 corresponding to (PuO$_2$$^{++}$), although there is some evidence of the existence of other fluoride-soluble oxidation states such as +5 +7, and +8. In this specification the lower and higher oxidation states are generally distinguished by referring to plutonium in the lower state as fluoride-insoluble plutonium and in the higher state as fluoride-soluble plutonium.

The present inventions more particularly based on my discovery that organic liquids of the general type of those capable of dissolving uranyl nitrate, (UO$_2$(NO$_3$)$_2$) are also capable of dissolving plutonyl nitrate (PuO$_2$(NO$_3$)$_2$), especially in the presence of high salt concentration, but such liquids, such as ethers, are substantially nonsolvents for plutonium in its lower oxidation state such as it exists in plutonous compounds, for example, Pu(NO$_3$)$_4$.

In accordance with one embodiment of my invention I dissolve the neutron irradiated uranium (containing element 94, element 93, uranium, fission products, and minor amounts of other substances) in an aqueous solution of nitric acid. Element 94 in this solution is present in its fluoride-insoluble (Pu$^{+4}$) state as plutonous nitrate. The uranium is present as uranyl nitrate and the fission products which consist mostly of rare earths and other elements in the groups having atomic numbers of between 35–44 are 51–58 and also present as the nitrates.

The aqueous solution is then agitated with an organic solvent of the type which is not completely miscible with aqueous liquids and which will dissolve uranyl nitrate, for example, diethyl ether. The ether extracts about 90% of the uranyl nitrate and about 1% of the fission products leaving substantially all of the element 94 in the aqueous phase as the plutonous nitrate.

The aqueous solution of plutonous nitrate is then oxidized to the fluoride-soluble (PuO$_2$$^{++}$) state with, for example, an oxidizing agent having a potential of at least 1.1 volts such as sodium dichromate. Soluble salts such as lithium nitrate (LiNO$_3$), and aluminum nitrate (Al(NO$_3$)$_3$) may also be added to the solution at this stage in order to increase the salt concentration and aid in bringing about a suitable solution of the plutonium in orange solvents, such as ether.

The aqueous solution of plutonyl nitrate (PuO$_2$(NO$_3$)$_2$) containing the high salt concentration is then agitated with an organic solvent of the type which is not completely miscible with water and which is capable of dissolving uranyl nitrate, for example, diethyl ether. In the ether phase there is then obtained 90% of element 94 as a solution of the plutonyl nitrate in the ether (together with any 93 which may be present), about 5% more of uranyl nitrate and 1% of fission products.

The ether solution of plutonyl nitrate may then be agitated with water containing a reducing agent such as sulfur dioxide whereby the plutonium dissolves in the water and is reduced to the plutonous state (Pu(NO$_3$)$_4$). The uranyl nitrate remains mostly in the ether since it is not reduced by the sulfur dioxide and is more soluble in this state in ether than in water. The plutons nitrate in the water phase may be recovered in various ways such as, for example, by precipitation with hydrogen fluoride, other soluble fluorides, iodates, OH$^-$, or any of the precipitants for rare earth compounds or thorium compounds.

The plutonyl nitrate may also be recovered and separated from the uranium and other impurities in the ether by reducing it in the ether phase to its plutonous state in which it is insoluble in ether.

For example, an ether-soluble reducing agent may be introduced into the ether whereby the plutonyl nitrate is reduced to plutonous nitrate and precipitates from the ether.

For some purposes a mixture of uranyl nitrate and plutonyl nitrate may be desirable. Such a composition containing only a small percentage of fission products may be readily obtained by evaporating the ether solution.

Other methods of obtaining the extracted plutonium either alone or admixed with uranium and free from or containing only small amounts of fission products will be apparent to those skilled in the art after reading this specification or the aforesaid copending application.

In the above described method of extraction the plutonium was extracted with ether while in aqueous solution in its higher oxidation state as, for example, plutonyl nitrate PuO$_2$(NO$_3$)$_2$ after a separate extraction of the uranium. This ether extraction was carried out in the presence of high salt concentration of lithium and aluminum nitrates and it was found that relatively poor results were obtained when the addition of salts was omitted.

In the preferred embodiment of the invention the initial and only necessary ether extraction was carried out in an aqueous solution of the neutron-irradiated composition containing plutonium in its higher oxidation state, i. e. in an aqueous solution containing plutonyl nitrate instead of the plutonous nitrate simultaneously with the uranium. Under these conditions the ether dissolved 90% of the uranyl nitrate present in the composition and 90% of the plutonyl nitrate, while only 1% of the fission products went into the ether phase. No addition of lithium and aluminum nitrates was made, the uranyl nitrate apparently acting in the same manner as these salts, since nearly quantitative extraction of plutonium was obtained in this procedure as was only obtained in the other procedure by the addition of salts.

The ether solution of plutonyl nitrate and uranyl nitrate may then be treated in the same manner as described for the separation of plutonyl nitrate in the previous extraction procedure, and substantially pure 94 (generally with a small amount of 93 which decays to 94), or a mixture of 94 and uranium obtained as desired.

In the above procedure the extraction is carried out from one liquid phase (generally aqueous) to another liquid phase (generally an organic liquid such as ether). There is also contemplated the extraction of a solid containing oxidized plutonium (such as $PuO_2(NO_3)_2$) with a liquid such as ether thus having a solid-liquid phase extraction.

Suitable extraction solvents for use in my process are those which dissolve compounds of plutonium while being substantially nonsolvents for at least one of the foreign substances present, and which, preferably also are solvents for plutonium in one of its oxidation states while being nonsolvents for plutonium in a different oxidation state. Where a two-liquid phase extraction is used, the solvent should be immiscible with the liquid, (usually an aqueous liquid) from which the plutonium is to be extracted. It has been found that in general organic liquids which are solvents for uranyl nitrate are suitable. Such liquids include ethers, for example, diethyl ether, methyl ethyl ether, isopropyl ether; ketones, for example methyl ethyl ketone, mixtures of acetone with sufficient xylene to give a water insoluble mixture; and also the nitroparaffins, for example, nitro propane, nitro butane.

Suitable oxidizing agents for oxidizing the plutonous compounds to the plutonyl state are those having a potential of at least about 1.1 volts, referring to the system of standard oxidation potentials which has the hydrogen-hydrogen ion couple as zero. In the presence of sulfuric acid it is desirable to use a more powerful oxidizing agent than in the absence of sulfuric acid. The following oxidizing agents have been found to be suitable:

Peroxydisulfate ion ($S_2O_8^=$) in the presence of $Ag^{++}$, $Ag^+$ couple
Ceric ion ($Ce^{+4}$)
Chlorine
$MnO_4^-$
Ozone in the presence of $Ag^{++}$, $Ag^+$ or $Ce^{+4}$, $Ce^{+3}$ couple
Bromine in the absence of sulfuric acid
Bromate ion ($BrO_3^-$) in the absence of sulfuric acid
Dichromate ion ($Cr_2O_7^=$)
Periodic acid ($H_5IO_6$ The fluoride-soluble ($PuO_2^{++}$) plutonium may be suitably reduced by sulfur dioxide and other reducing agents including hydrogen peroxide. In general, reducing agents above $-1.1$ volts in the Latimer Hildebrand standard tables and which when uranium is present are not so powerful as to reduce the uranium ion at an appreciable rate, are suitable.

The following examples are given by way of illustration, it being understood that it does not limit the invention to the details given and that macroscopic amounts of element 94 may be separated as well as the tracer amounts given in the examples.

EXAMPLE I

An initial aqueous solution consisting of the following was used:

9.0 cc. of saturated lithium nitrate
9.5 cc. of fluoride-insoluble $94^{239}$ tracer (328 counts/minute)
9.5 cc. of fission products plus uranium, about 10,000 counts per minute of fission product beta activity and about 3 mg. of $UO_2(NO_3)_2.6H_2O$ (about 1200 uranium alpha counts per minute as determined with a thin layer of aliquot)

The volume of diethyl ether used was 1.5 times the volume of the aqueous solution.

The first extraction of the contents of the aqueous solution with the ether gave an alpha activity in the ether of approximately 1200 counts per minute. Practically all of the activity as measured by evaporation to dryness of an aliquot of the solution, was due to uranium. The 94 activity in the ether layer was 8 counts per minute as determined by precipitation with $La^{+++}$ and HF. The beta activity was about 100 counts per minute.

The material in the water layer from the first extraction was then oxidized with chlorine ($Cl_2$), and the second extraction with ether was carried out. The alpha activity of the ether layer, as determined by evaporating to dryness an aliquot of the solution was approximately 300 counts per minute. That nearly all of this activity was from 94 was proved by performing a $La^{+++}$, HF precipitation on another aliquot of the solution. The beta activity accompanying the 94 was about 40 counts per minute. In other words, the final product was substantially pure ether solution of 94.

The results of the experiment are summarized below:

Table I.—The separation of 94 from fission products and uranium by ether extraction

| Percent Material in Ether Layer After First Extraction ($Pu^{+4}$) | | | Percent Material in Ether Layer After Oxidation of 94 | | |
| --- | --- | --- | --- | --- | --- |
| $Pu^{++++}$ | U | Fission Products | $PuO_2^{++}$ | U | Fission Products |
| 2.5 | 97 | <1 | 86 | 3% | <1 |

In the extraction of macroscopic and commercial amounts of 94 it is advisable to use an oxidizing agent such as $Cr_2O_7^=$ in acid solution instead of chlorine in alkaline solution in order to avoid danger of precipitation of the 94 from alkaline solutions.

The following method illustrates the method in which the initial extraction is carried out with the higher oxidized plutonium instead of with the lower oxidized state, as in the previous example.

EXAMPLE II

A 50 gram sample of neutron-bombarded $$UO_2(NO_3)_2.6H_2O$$

was melted and sufficient sodium dichromate and nitric acid to make their concentrations 0.2 M and 0.5 M respectively were added to oxidize the plutonium and any neptunium present to their fluoride-soluble states. The fission products and the $94^{239}$ present in the original sample served as tracers for these elements. The solution containing the uranyl nitrate, plutonyl nitrate, small amount of neptunyl nitrate, and fission products was agitated with diethyl ether and over 90% of the plutonium, most of the uranium, and about 1% of the fission products dissolved into the ether layer of the resulting two-phase system. The ether layer was then shaken with small portions of water saturated with $SO_2$ in order to reduce and extract the plutonium. The combined water portions contained only a small fraction of the original uranium, about 90% of the plutonium (with decaying 93) and about 1% of the fission products.

The element 93 which is generally only present with the 94 in small proportions may be allowed to decay to the 94 or may be separated from the 94 by the oxidation-precipitation method described in the aforementioned copending application.

The fission products remaining with the 94 which are not removed by the ether extraction may be removed by repeating one of the above cycles or may be removed if desired by precipitating the plutonium from the aqueous solution with fluoride ion or other precipitants as described in the aforementioned copending application, redissolving the precipitate and oxidizing the plutonium to the fluoride-soluble state and adding fluoride ion to precipitate any remaining fission products.

Our extraction process is particularly useful for removing fission products and uranium from neutron-irradiated uranium. When uranium is bombarded with slow neutrons the uranium isotope $U^{235}$ breaks down into two fragments, which undergo beta disintegration into chains of elements, one chain group consisting of elements of atomic number 35–44; the other of elements 51–58. This breakdown of the uranium is called fission and the elements formed by the fission and subsequent beta decay are called fission products. Among the important fission products removed by our extraction process are those having a half-life of more than three days including from the 35–44 atomic number group, $38Sr^{89}$, $39Y$, $40Zr$, $Ru$; and from the 51–58 atomic number group $52Te^{127}$, $54Xe^{133}$, $55Cs$, $Ba$, $La$, and $Ce$. The uranium and the minor amounts of $UX_1$, and $UX_2$ are also removed by our extraction process. The element 93 is not completely removed but since it decays with a half-life of 2.3 days to 94 its removal is not important, but may be effected if desired by the precipitation, oxidation and reduction method described in the aforementioned copending application.

While there have been shown and described certain embodiments of my invention it is to be understood that it is capable of many modifications. Changes, therefore, may be made without departing from the spirit and scope of the invention as described in the appended claims, in which it is the intention to claim all novelty inherent in the invention as broadly as possible in view of the prior art.

I claim:

1. The method of separating fission products, uranium, and plutonium from a composition comprising said substances, which comprises forming an aqueous solution of said composition containing plutonous nitrate, uranyl nitrate and fission product nitrates, contacting the aqueous solution with an ether which is immiscible with the aqueous solution, separating an aqueous phase and an ether extract phase containing a portion of uranyl nitrate, oxidizing plutonium in the aqueous phase to the plutonyl state, contacting the resultant aqueous solution with an ether which is immiscible with the aqueous solution, separating an aqueous phase and an ether extract phase containing a portion of the uranyl nitrate and plutonyl nitrate, contacting said ether extract phase containing the plutonyl nitrate with an aqueous solution of a reducing agent to reduce the plutonyl ion to the plutonous state, and separating an ether solvent phase containing the uranyl nitrate and an aqueous extract phase containing plutonous nitrate.

2. The method of separating fission products, uranium, and plutonium from a composition comprising said substances, which comprises forming an aqueous solution of said composition containing plutonous nitrate, uranyl nitrate and fission product nitrates, contacting the aqueous solution with an ether which is immiscible with the aqueous solution, separating an aqueous phase and an ether extract phase containing a portion of uranyl nitrate, oxidizing the plutonium in the aqueous phase to the plutonyl state, contacting the resultant aqueous solution with an ether which is immiscible with the aqueous solution, and separating an aqueous phase and an ether extract phase containing a portion of the uranyl nitrate and plutonyl nitrate.

3. The method of separating fission products, uranium, and plutonium from a composition comprising said substances, which comprises forming an aqueous solution of said composition containing plutonous nitrate, uranyl nitrate and fission product nitrates, oxidizing the plutonium to the plutonyl state, contacting the resultant aqueous solution with an ether which is immiscible with the aqueous solution, separating an aqueous phase and an ether extract phase containing uranyl nitrate and plutonyl nitrate, contacting said ether extract phase with an aqueous solution of a reducing agent to reduce the plutonyl ion to the plutonous state, and separating an ether phase containing the uranyl nitrate and an aqueous extract phase containing plutonous nitrate.

4. The method of separating fission products and plutonium from a composition comprising said substances, which comprises forming an aqueous solution of said composition containing plutonium as plutonous nitrate, oxidizing the plutonium to the plutonyl state, contacting the resultant aqueous solution with an ether which is immiscible with the aqueous solution, separating an aqueous phase and an ether extract phase containing plutonyl nitrate, contacting said ether extract phase with an aqueous solution of a reducing agent to reduce the plutonyl ion to the plutonous state, and separating an ether phase and an aqueous extract phase containing plutonous nitrate.

5. The method of separating fission products, uranium, and plutonium from a composition comprising said substances, which comprises forming an aqueous solution of said composition containing plutonous nitrate, oxidizing the plutonium to the plutonyl state, contacting the resultant aqueous solution with an ether which is immiscible with the aqueous solution, separating an aqueous phase and an ether extract phase containing uranyl nitrate and plutonyl nitrate, and contacting said ether extract phase with a reducing agent to reduce the plutonyl ion to the plutonous state and to precipitate a plutonous salt.

6. The method of separating fission products and plutonium, which comprises contacting an aqueous solution of fission product nitrates and plutonyl nitrate with an ether which is immiscible with the aqueous solution, separating an aqueous phase and an ether extract phase containing plutonyl nitrate, contacting said ether extract phase with an aqueous solution of a reducing agent, and separating an ether phase and an aqueous extract phase containing plutonous nitrate.

7. The method of claim 6 wherein the ether is diethyl ether.

8. The method of claim 7 wherein the reducing agent is sulfur dioxide.

9. The method of separating fission products and plutonium, which comprises contacting an aqueous solution of fission product nitrates and plutonyl nitrate with an ether which is immiscible with the aqueous solution, separating an aqueous phase and an ether extract phase containing plutonyl nitrate, and contacting said ether extract phase with a reducing agent to reduce the plutonyl ion to the plutonous state and to precipitate a plutonous salt.

10. The method of removing uranium from a composition comprising uranium, fission products, and plutonium, which comprises forming an aqueous solution of plutonous nitrate, uranyl nitrate and fission product nitrates, contacting the aqueous solution with an ether which is immiscible with the aqueous solution, and separating an aqueous phase containing plutonous nitrate and an ether extract phase containing a major portion of the uranyl nitrate.

References Cited in the file of this patent

Hackh: "Chemical Dictionary," 2nd Edition, pp. 624, 734, P. Blakiston's Sons & Co., Philadelphia (1937).

Klopin et al.: Comptes Rendus de l'Academie des Sciences de l'URSS, vol. 24, pp. 118–121 (1939).

UNITED STATES PATENT OFFICE
CERTIFICATE OF CORRECTION

Patent No. 2,811,415                                              October 29, 1957

Glenn T. Seaborg

It is hereby certified that error appears in the printed specification of the above numbered patent requiring correction and that the said Letters Patent should read as corrected below.

Column 1, line 54, for "inventions" read -- invention is --; line 70, for "are 51-58 and" read -- and 51-58 are --; column 2, line 13, for "platonium" read -- plutonium --; line 14, for "orange" read -- organic --; line 30, for "plutons" read -- plutonous --; column 4, lines 68 to 70, strike out "by the oxidation-precipitation method described in the aforementioned copending application"; same column 4, line 75, and column 5, line 1, strike out "as described in the aforementioned copending application".

Signed and sealed this 9th day of June 1959.

(SEAL)
Attest:

KARL H. AXLINE
Attesting Officer

ROBERT C. WATSON
                                                                                              Commissioner of Patents